Sept. 28, 1926.
H. ADELMANN
1,601,156
APPARATUS FOR THE TREATMENT OF MEAT
Filed April 2, 1925
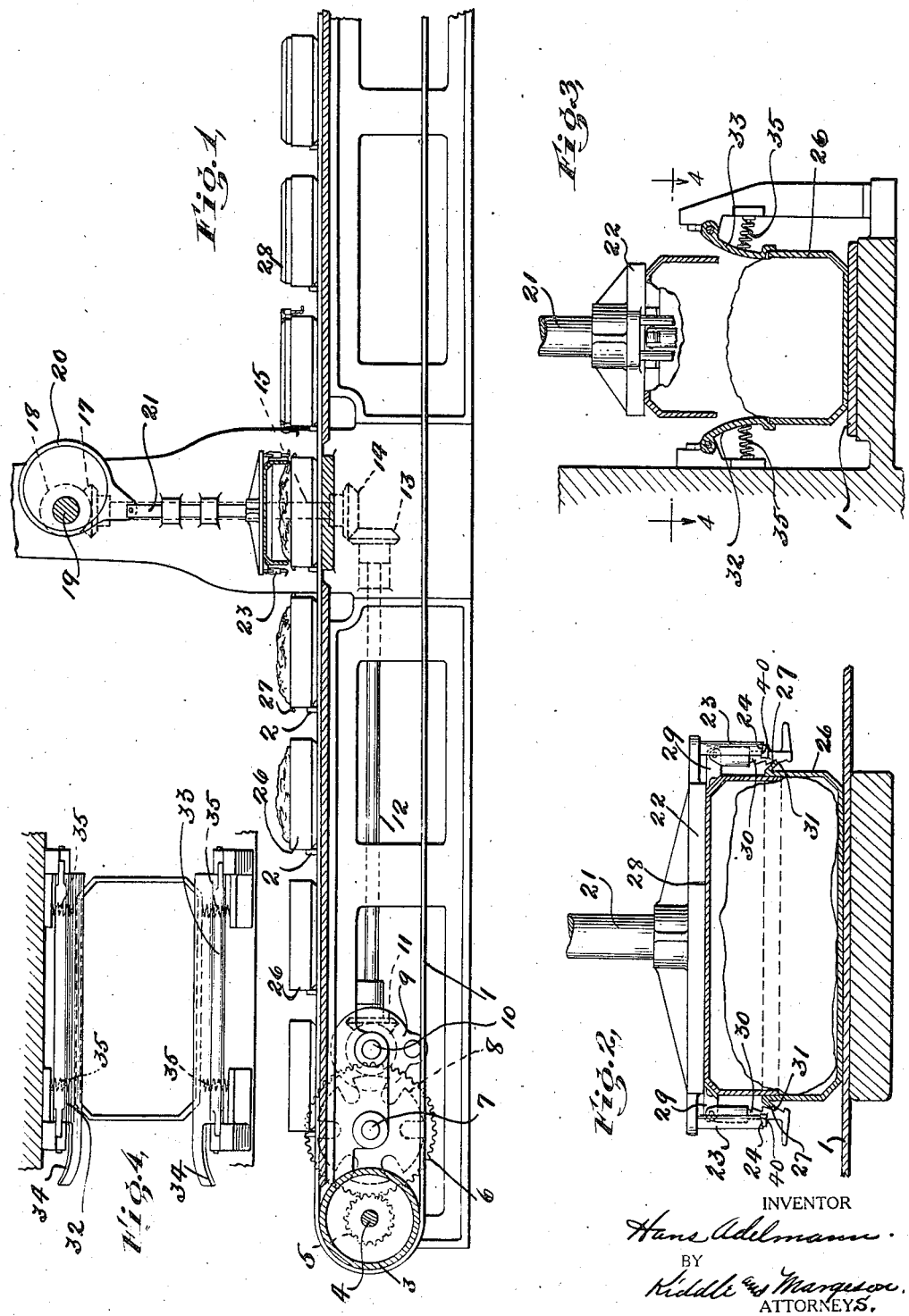
INVENTOR
Hans Adelmann
BY
Kiddle and Margeson
ATTORNEYS.

Patented Sept. 28, 1926.

1,601,156

UNITED STATES PATENT OFFICE.

HANS ADELMANN, OF NEW ROCHELLE, NEW YORK, ASSIGNOR TO HAM BOILER CORPORATION, OF NEW YORK, N. Y., A CORPORATION OF NEW YORK.

APPARATUS FOR THE TREATMENT OF MEAT.

Application filed April 2, 1925. Serial No. 20,096.

My invention relates to an improved apparatus for the treatment of meat, being particularly directed to an improved apparatus for the treatment of meat joints such as boned hams, for example.

One of the objects of my invention is the provision of an improved apparatus for the handling of meats such as above referred to, whereby the placing of the same in containers or molds for cooking under compression will be facilitated.

It is customary at the present time to place the joints by hand in a metal container, a flat plate or cover then being pressed down upon the meat and locked in position to hold the meat under compression, the container with the meat therein thereafter being submerged in boiling water for cooking. This method requires several operators and is too slow to be satisfactory when the joints are being handled in quantities.

In my improved apparatus I provide a conveyor working in conjunction with a press, the conveyor and press being properly timed so that the joints may be placed in the containers and then conveyed to the press, where the conveyor stops to permit the upper section of the conveyor to be placed, the press operated and the upper container section locked in position with the meat under compression before the conveyor resumes operation to advance the next container to the press. This reduces the cost of handling of the joints and containers to a minimum and also reduces the time required in the operation, with a consequent increase in output.

I have shown in the accompanying drawings one form of my invention, but it is to be understood that other forms may be employed within the spirit of my invention. The receptacle or boiler employed with my improved apparatus is of special construction, being made of pressed metal, and hence free of joints, and provided with plane exterior and interior surfaces, thereby providing a container which may be readily kept clean. The container employed or illustrated in this application is for the purposes of illustration only and will not be claimed in detail, inasmuch as the same constitutes the subject matter of another application.

In the accompanying drawings—

Fig. 1 is a part sectional elevational view of my improved apparatus;

Fig. 2 is an enlarged view of the apparatus at the press, this view being in part section and in part elevation;

Fig. 3 is an end view of the press, this view being a sectional elevational view; and Fig. 4 is a view taken at the line 4—4 of Fig. 3.

Referring to the drawings in detail, 1 designates a conveyor of the endless type provided at intervals on its outer face with stops or carriers 2, these stops or carriers being in the form of lugs evenly spaced along the outer face of the conveyor belt. The conveyor passes over pulleys at each end of the machine, one of these pulleys having been shown on the drawing and designated 3. The shaft 4 on which the pulley 3 is mounted carries a gear 5 in mesh with the teeth on a gear 6 mounted upon a shaft 7 extending transversely of the conveyor. The shaft 7 carries a Geneva gear 8 adapted to be rotated by cam 9 mounted upon the shaft 10 and constantly rotated by bevelled gear 11. This driving mechanism provides an intermittent drive for the conveyor 1, the Geneva gear 8 and gear 6 being rotated only when the high point on the member 9 is in engagement with the gear 8. The bevelled gear 11 above referred to is mounted upon a shaft 12 which extends lengthwise of the conveyor and carries a bevelled gear 13 at its other end in constant mesh with a bevelled gear 14 mounted upon a vertically extending shaft 15. This shaft 15 may be located at any convenient point intermediate the ends of the conveyor. The shaft 15 is mounted in suitable bearings and at its upper end carries a bevelled gear 17 meshing with a bevelled gear 18 on a shaft 19 disposed transversely of conveyor 1. This shaft carries an eccentric 20 to which is attached a conencting rod 21, carrying a plunger 22 at its lower end. This plunger, as will be seen from the enlarged view of Fig. 2, is in the form of a rectangular plate and has lock-operating members 23 attached to its outer edges. Two of these members are provided and the lower end of each member is slightly bevelled off, as indicated at 24.

The stops or carriers 2 on the conveyor 1 are spaced apart sufficiently to permit of the insertion of a meat boiler or mold between each pair. Each of these boilers comprises a lower one-piece section 26, pressed out of steel, for example, and provided with plane exterior and interior surfaces, the upper edge of this lower section being provided at each end with a small projection 27 which may be formed on the boiler when the same is pressed out. The boiler is also provided with an upper section 28 of substantially the same depth as the lower section 26, this upper section also being made of pressed metal and provided with plane exterior and interior surfaces. At each end of the upper section 28 is riveted a bracket 29, from which is resiliently suspended a hook or locking member 30 provided with teeth 31 adapted to engage the flange 27 when the upper section is in place on the boiler.

Mounted on any convenient support adjacent the meat press I provide two elongated pivoted plates 32 and 33, spaced from each other. These plates are curved transversely to provide a convex upper surface and are given a slight flare at one end as indicated at 34. The plates are spaced sufficiently and so located with respect to the conveyor 1, that the meat molds or containers pass between them as the containers reach the press. Springs 35 hold the plates in operative position and yet provide for a certain amount of resiliency in the plates.

In the operation of my improved machine the containers 25 are placed in order on the conveyor 1 and the joints placed therein, or the joints may be placed in these containers before the same are placed upon the conveyor, just as desired. The rear ends of the boilers are placed in engagement with the carriers or stops 2, the conveyor, as shown in Fig. 1, moving from right to left. The conveyor, it will be understood, is operating intermittently as above described, the boilers being placed thereupon while the conveyor is standing still or in motion, as the case may be. As the conveyor advances a lower mold section 26 through the space between the plates 32 and 33 any part of the joint within the mold which overhangs the top of the same will be wiped by the plates 32 and 33 into the container, that is to say, within the plane of the inner faces of the mold section walls. The conveyor is so timed that the same will come to rest with the mold section between the wiping plates. The upper section 28 of the mold is now placed in position, and as the press plunger is lowered this upper mold section will be forced downwardly to be telescoped by the lower mold section 26 to completely enclose the meat joint, which it will be borne in mind has been wiped within the planes of the inner faces of the lower section walls. Continued movement of the plunger 22 will force the upper section 28 downwardly to the position shown in Fig. 2, the bevelled ends 24 of the cams 23 engaging cam faces 40 on the locking members 30 to force the same downwardly against the action of their respective springs until the plunger has reached its limit of travel, whereupon one of the teeth on the locking members 30 will engage with the flanges 27 on the ends of the receptacle to lock the upper section 28 to the lower section 26 of the mold. As the plunger 22 begins its upward movement the member 9 of the driving mechanism of the conveyor will have moved to position to again engage the gear 8 to cause the conveyor to again advance to bring the next mold in line with the press.

It will be seen, therefore, that I have provided an apparatus in which the maximum number of joints may be handled in the minimum time at the minimum of expense, inasmuch as the operation of the entire machine is practically automatic. It will be seen also that time is saved by providing means for wiping or forcing any overhanging portions of the joint into the container, so that no great care need be exercised in the initial placing of the joints in the containers.

What I claim is:

1. In an apparatus of the class described, the combination of a container, a press for compressing the meat carried within said container, a plunger for said press, and yieldingly mounted plates for engaging the meat within the said container in advance of the compresison of the meat by said plunger, to retain the meat within the plane of the inner face of the container sides.

2. In a machine of the class described a press comprising a plunger, a receptacle comprising upper and lower sections, said upper section being applied to the lower section by said plunger, locking mechanism carried by the upper section of said container for locking the two sections of the container to each other, and cam mechanism attached to said plunger for effecting the operation of said locking mechanism during the application of the upper section of the container to the lower section.

3. In a machine of the class described the combination of a receptacle comprising upper and lower sections, a press for applying the upper section to the lower section of the receptacle to compress the meat contained within the receptacle, and yieldable plates adapted to retain the meat within the confines of the receptacle during the application of the upper receptacle section, said plates being actuated out of meat-engaging position by the application of the upper receptacle section.

This specification signed this 27th day of March 1925.

HANS ADELMANN.